(12) United States Patent  
Pardo et al.

(10) Patent No.: US 10,538,447 B2  
(45) Date of Patent: Jan. 21, 2020

(54) OPTIMISED ENERGY EFFICIENCY HYDROTHERMAL CARBONIZATION METHOD AND DEVICE

(71) Applicant: SUEZ INTERNATIONAL, Paris la Defense (FR)

(72) Inventors: Pierre Emmanuel Pardo, Orsay (FR); Jean-Louis Bourdais, Chateaubriant (FR)

(73) Assignee: SUEZ INTERNATIONAL, Paris (FR)

( * ) Notice: Subject to any disclaimer, the term of this patent is extended or adjusted under 35 U.S.C. 154(b) by 201 days.

(21) Appl. No.: 15/325,019

(22) PCT Filed: Jun. 3, 2016

(86) PCT No.: PCT/EP2016/062703  
§ 371 (c)(1),  
(2) Date: Jan. 9, 2017

(87) PCT Pub. No.: WO2016/193463  
PCT Pub. Date: Dec. 8, 2016

(65) Prior Publication Data  
US 2017/0197858 A1    Jul. 13, 2017

(30) Foreign Application Priority Data  
Jun. 5, 2015   (FR) ...................... 15 55149

(51) Int. Cl.  
*C02F 1/30* (2006.01)  
*C02F 11/18* (2006.01)  
(Continued)

(52) U.S. Cl.  
CPC .............. *C02F 11/10* (2013.01); *C02F 1/302* (2013.01); *C02F 11/18* (2013.01); *C10L 9/086* (2013.01);  
(Continued)

(58) Field of Classification Search  
CPC combination set(s) only.  
See application file for complete search history.

(56) References Cited

U.S. PATENT DOCUMENTS 8,673,112 B2    3/2014   Nilsen et al.  
2014/0209093 A1*  7/2014  Medoff .................. H01J 5/18  
                                              127/42

(Continued)

FOREIGN PATENT DOCUMENTS

FR    3 010 403 A1     3/2015  
WO    2014/135734 A2   9/2014  
WO    2014/178028 A1   11/2014

OTHER PUBLICATIONS

Pardo et al., (WO2014178028, [Nov. 2014]; an English translation of this reference was used for the purposes of said teachings) (Year: 2014).*

(Continued)

*Primary Examiner* — Prem C Singh  
*Assistant Examiner* — Chantel L Graham  
(74) *Attorney, Agent, or Firm* — Young & Thompson

(57) ABSTRACT

A method of continuous hydrothermal carbonization of sludge containing organic matter, involving a stage of hydrothermal reaction carried out in a reactor (4), includes:
- a step of introduction of sludge in which the sludge is introduced into the reactor (4) by a first inlet (11),
- a step of endogenous injection of steam in which steam is injected into the reactor (4) by a second inlet (15) distinct from the first inlet (11),
- a step of extraction in which at least a portion of the sludge contained in the reactor (4) is extracted continuously by a sludge outlet (16),
- a step of preheating in which the temperature of the sludge is raised prior to its introduction into the reactor (4) up (Continued)

Figure 1:
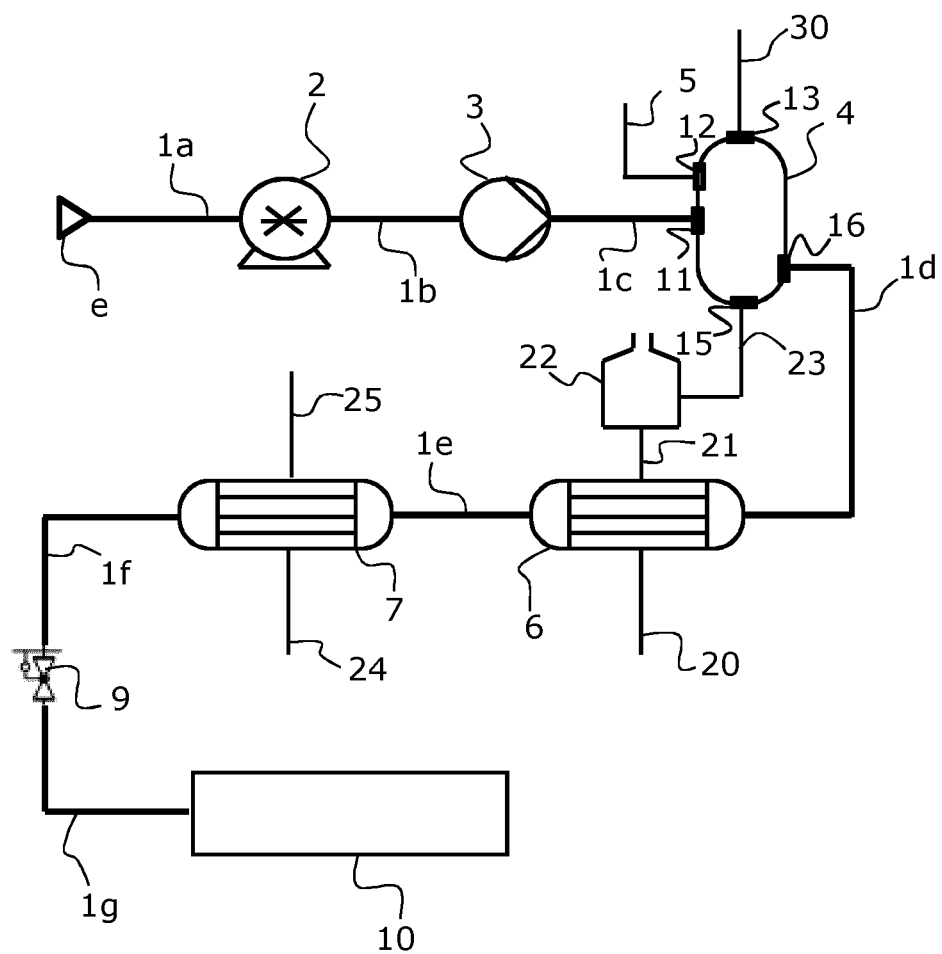

to a temperature of preheating greater than 70° C. Also disclosed is a device making it possible to carry out such a method.

20 Claims, 4 Drawing Sheets

(51) Int. Cl.
  *C10L 9/08* (2006.01)
  *C02F 11/10* (2006.01)
  *C02F 101/30* (2006.01)
(52) U.S. Cl.
  CPC ....... *C02F 2101/30* (2013.01); *C10L 2290/06* (2013.01); *C10L 2290/36* (2013.01)

(56) References Cited

U.S. PATENT DOCUMENTS

2016/0052815 A1  2/2016  Pardon et al.
2016/0214880 A1  7/2016  Chauzy et al.

OTHER PUBLICATIONS

Chen et al. Microwave Drying of Wastewater Sewage Sludge, Journal of Clean Energy Technologies, vol. 2, No. 3, Jul. 2014, pp. 282-286 (Year: 2014).*
Zhenyu et al. "Microwave Drying of Wastewater Sewage Sludge", Journal of Clean Energy Technologies, Jul. 31, 2014, pp. 282-286, XP055209569, ISSN: 1793-821X.
International Search Report, dated Aug. 5, 2016, from corresponding PCT application.

* cited by examiner

OPTIMISED ENERGY EFFICIENCY HYDROTHERMAL CARBONIZATION METHOD AND DEVICE

TECHNICAL FIELD

The present invention concerns a method and a device for hydrothermal carbonization.

The field of the invention is more particularly but not limited to that of the treatment of sludge heavily loaded with organic material, for example that coming from processes of decontamination of urban or industrial waste waters, or sewage cleaning operations. Such a treatment is intended to reduce the volume of the sludge, to stabilize it in a biological and physicochemical respect, and to produce by-products which can be marketed.

More particularly, the invention concerns the field of the method and a device for continuous hydrothermal carbonization of sludge containing organic matter.

PRIOR ART

The prior art has developed two families of treatment:
thermal hydrolysis,
hydrothermal carbonization.

The technique of thermal hydrolysis of sludge was created by Porteous in the early 20th century. This technique implements pressurized reactors, operating in sequence. Typically, the sludge is pumped into a first reactor in which steam produced by a boiler is injected until a temperature of around 180° C. is obtained for a pressure of 1.5 MPa inside this first reactor, the temperature there is then maintained for 30 minutes, and then the sludge is evacuated under its own pressure through a heat exchanger. This heat exchanger is used to recover the heat contained in the sludge leaving the first reactor and to reheat the sludge before it enters a second reactor. Many modifications and improvements have since occurred to improve the productivity and ensure a continuous operation. The hydrolyzed sludge, that is the sludge having undergone such a treatment in a reactor, is then subjected to biological treatments, for example, anaerobic digestion to reduce the quantities of sludge by producing biogas from it.

The technique of hydrothermal carbonization (HTC) is similar to thermal hydrolysis, but does not aim to prepare the sludge with a view to its digestion, but rather to transform the sludge into carbon-neutral biochar of high quality, by the use of heat and a pressure generally higher than in thermal hydrolysis, and by ensuring a longer dwell time for the sludge than that of thermal hydrolysis (several hours) and generally in the presence of a reagent.

The HTC technique also makes it possible to produce biochar, a product resembling humus, which can be used to amend agricultural soil and sequester CO2. The technique of hydrothermal carbonization was described in 1913 by Friedrich Bergius, which won him the Nobel Prize for chemistry in 1931.

There is known in the prior art the patent FR 3010403 which describes a method and a device for thermal hydrolysis of sludge containing organic matter, said method involving steps consisting in:

performing simultaneously an injection of recuperation steam in said sludge and a mixing of said sludge with said recuperation steam by means of a primary dynamic injector-mixer so as to obtain a uniform primary mixture;

performing simultaneously an injection of live steam in said uniform primary mixture and a mixing of said uniform primary mixture with said live steam by means of a secondary dynamic injector-mixer so as to obtain a uniform secondary mixture;

routing said uniform secondary mixture to a pressurized tube reactor and causing the substantially piston flow movement of this uniform secondary mixture in said tube reactor for a sufficient dwell time and at a sufficient temperature to permit the thermal hydrolysis of the organic matter present in this uniform secondary mixture;

producing said recuperation steam within means of production of recuperation steam from said uniform secondary mixture obtained at the outlet of said tube reactor;

cooling said uniform secondary mixture at its outlet from said means of production of recuperation steam at a temperature enabling a subsequent digestion of the hydrolyzed organic matter which it contains.

The American U.S. Pat. No. 8,673,112 also describes a method for thermal hydrolysis consisting in:

(i) supplying biomass (particularly sludge) in approximately continuous manner so that it can undergo a first stage of preheating, and preheating it, (ii) moving the preheated biomass sequentially into at least two reactors, (iii) heating and pressurizing one reactor by addition of steam, (iv) maintaining the reactors at a certain temperature and pressure for a certain time, (v) moving the heated and pressurized biomass coming from the reactors to a first tank for decompression without substantial reduction of pressure and rapid decompression of the biomass, by means of a nozzle, in order to disintegrate it, (vi) transferring the biomass from the first decompression tank to a second decompression tank whose pressure is less than the pressure of the first decompression tank, (vii) and taking the biomass so treated to a downstream installation for it to undergo further treatment.

This American U.S. Pat. No. 8,673,112 also concerns a device for the thermal treatment of the biomass.

The international patent application WO 2014135734 describes a method which runs continuously for the thermal hydrolysis of organic matter, comprising a preheating stage, a further reaction stage and a depressurization stage. The preheating stage involves a recirculation of the organic matter being hydrolyzed in a first recirculation circuit; the reaction stage involves a recirculation in a second recirculation circuit of the organic matter extracted from the first recirculation circuit by subjecting it to a certain pressure and to a certain temperature; and the depressurization stage involves a decompression undergone by the organic matter extracted continuously from the second circuit.

DRAWBACKS OF THE SOLUTIONS OF THE PRIOR ART

The solutions of the prior art, especially the international patent application WO 2014135734, are more adapted to applications of thermal hydrolysis followed by a stage of bacterial digestion. For such applications, the levels of pressure and temperature within the reactor are relatively moderate, on the order of 0.6 MPa and 160° C. For applications of hydrocarbonization type, the levels of pressure and temperature are distinctly higher, on the order of 3 MPa and 200° C.

Hence, the solution of having an injector-mixer at the entrance to the reactor is not adapted to the application of hydrocarbonization. In fact, to achieve the temperatures required, it is necessary to supply more steam, which results in a dilution that is harmful to the proper functioning of the reactor, as well as the post-treatment equipment downstream. The required pressure and temperature conditions lead to elevated stresses on the injection equipment, causing leaks and corrosion harmful to the service life of the equipment.

Furthermore, the rise in temperature of the sludge injected into the reactor by preheating reduces its apparent viscosity, for unchanged dryness, until one obtains a viscosity near that of water, the dryness being defined as the content of dry matter in the biomass or sludge.

In the solution proposed by the American U.S. Pat. No. 8,673,112, the layout requires a plurality of reaction tanks, which considerably complicates the layout and is not compatible with a continuous operation.

The goal of the present invention is to solve at least one of the aforementioned problems or drawbacks.

DISCLOSURE OF THE INVENTION

For this, the invention proposes a method of continuous hydrothermal carbonization of sludge containing organic matter, said sludge having a dryness between 10 and 30%, said method involving a stage of hydrothermal reaction carried out in a reactor (and preferably at least one cooling stage in which the sludge having undergone the hydrothermal reaction stage is cooled), the hydrothermal reaction stage involving the following steps:
 a step of introduction of sludge in which the sludge is introduced into the reactor by a first inlet,
 a step of endogenous injection of steam in which steam is injected into the reactor by a second inlet,
 a step of extraction in which at least a portion of the sludge contained in the reactor is extracted continuously by a sludge outlet,
 this method further involving a step of preheating in which the temperature of the sludge is raised prior to its introduction into the reactor up to a temperature of preheating greater than 70° C.,
 the second inlet being distinct from the first inlet.

The term "endogenous" refers to the fact that the steam is injected into the sludge contained in the reactor, as opposed to the term "exogenous", referring to an injection of steam into the sludge being present outside the reactor.

In this description, by the phrase "extracted continuously" is meant a continuous extraction with an optionally variable flow rate, preferably controlled by the operating parameters of the reactor. Such a continuous extraction may be interrupted temporarily when the settings are unable to restore the equilibrium of the hydrothermal carbonization process. The continuous extraction is not a sequential extraction, and it is not an extraction by lot or by "batch".

The step of preheating may include a step of microwave injection in which microwaves are injected into the sludge prior to its introduction into the reactor.

In one embodiment, the step of preheating may involve a step of exogenous steam injection in which steam is injected into the sludge prior to its introduction into the reactor, and the method furthermore involves a step of additional heating in which the temperature is raised for the sludge having undergone the step of preheating prior to its introduction into the reactor by transferring to this sludge the heat contained in the sludge extracted from the reactor.

The step of preheating may involve a step of recirculation in which a fraction of the sludge contained in the reactor is removed and in which this fraction is mixed with the sludge prior to its introduction into the reactor.

Preferably, the method may furthermore involve a step of circulation in which a mixture consisting of the sludge contained in the reactor and the steam injected into the reactor is placed in circulation within the reactor.

The method according to the invention may further involve a step of heating of water in which heat contained in the sludge extracted from the reactor is transferred to water by means of a heat exchanger, and in which the water so heated is used to produce some or all of the steam used during the step of endogenous steam injection.

The invention also concerns a device for continuous hydrothermal carbonization of sludge containing organic matter, said sludge having a dryness between 10 and 30%, this device comprising a reactor having:
 a first inlet designed to introduce the sludge into the reactor,
 a second inlet designed to inject steam directly into the reactor,
 a sludge outlet designed to continuously extract at least a portion of the sludge contained in the reactor from it,
 this device furthermore comprising a means of preheating upstream from the first inlet, this means of preheating being designed to receive the sludge prior to its introduction into the reactor and to raise the temperature of the sludge which it receives up to a temperature of preheating greater than 70° C.,
 the second inlet being distinct from the first inlet.

According to an advantageous characteristic, the means of preheating may be designed to inject microwaves into the sludge which it receives.

According to another advantageous characteristic, the means of preheating may be designed to inject steam into the sludge which it receives, and the device may furthermore comprise means of additional heating, designed to transfer heat contained in the sludge extracted from the reactor to the sludge downstream from the means of preheating and upstream from the reactor, so as to raise the temperature of the sludge downstream from the means of preheating and upstream from the reactor.

According to yet another advantageous characteristic, the device may comprise a recirculation loop designed to remove a fraction of the sludge contained in the reactor and to mix this fraction with the sludge received by the means of preheating.

The device according to the invention may furthermore comprise a heat exchanger and a boiler, this heat exchanger being designed to transfer heat contained in the sludge extracted from the reactor to water circulating between this heat exchanger and the boiler, the boiler being designed to furnish some or all of the steam injected into the reactor by the second inlet.

DESCRIPTION OF THE FIGURES AND EMBODIMENTS

Figure 2:
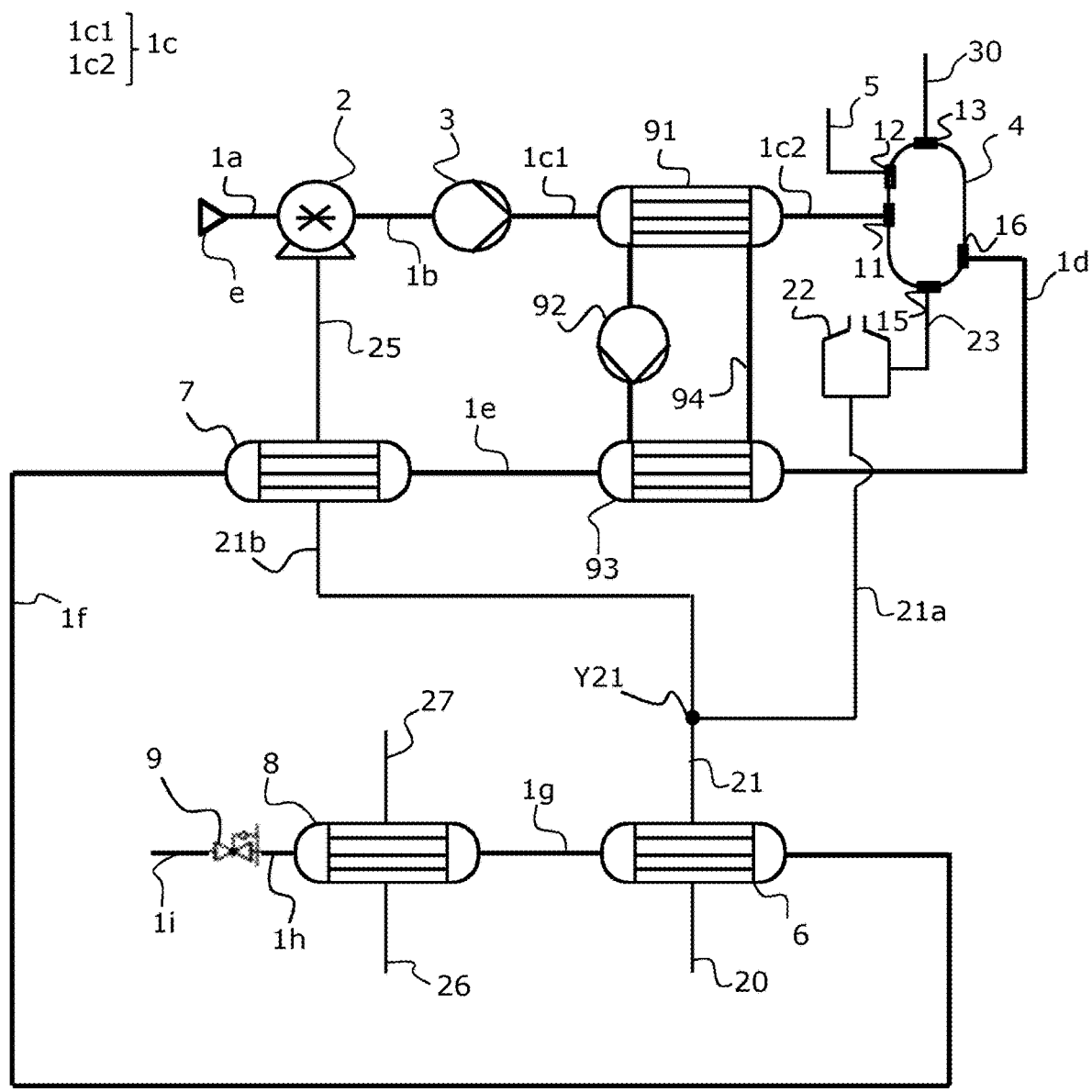
Figure 3:
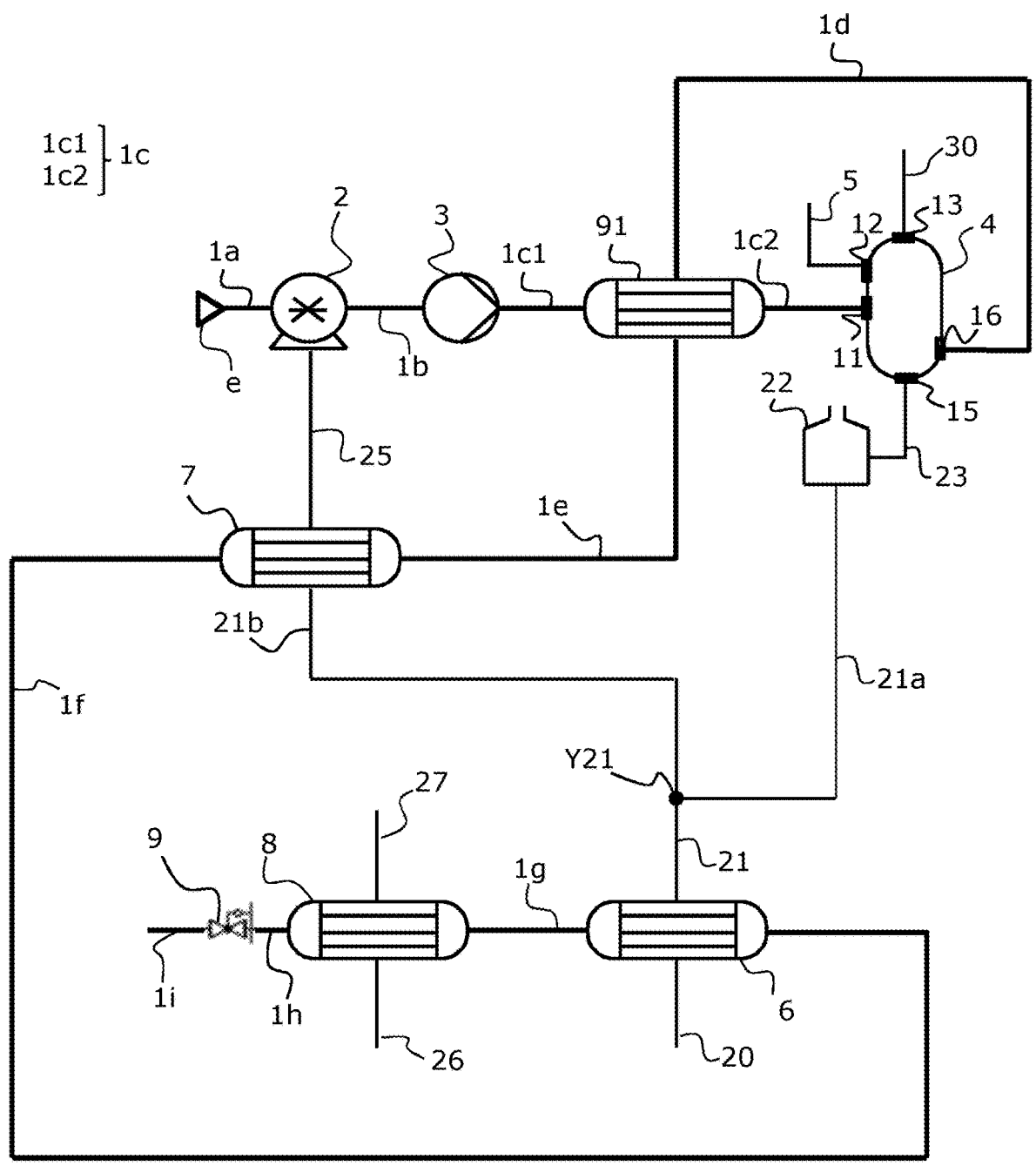
Figure 4:
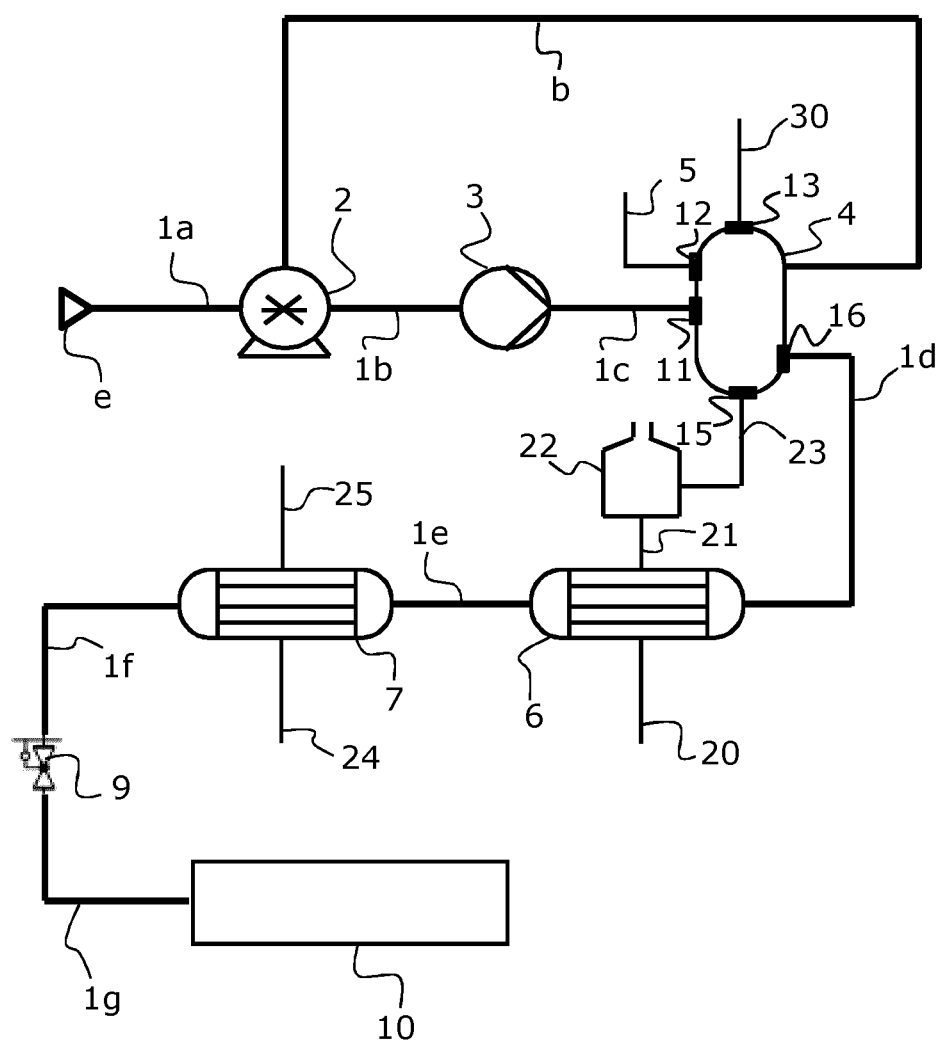

Other advantages and features of the invention will appear upon perusal of the detailed description of embodiments and modes of implementation which are in no way limiting, and the following enclosed drawings:

FIG. 1 shows a schematic view of a first variant of the device according to the invention, FIG. 2 shows a schematic view of a second variant of the device according to the invention, FIG. 3 shows a schematic view of a third variant of the device according to the invention, FIG. 4 shows a schematic view of a fourth variant of the device according to the invention.

The modes of implementation described below are in no way limiting, and in particular variants of the invention could be considered comprising only a selection of described characteristics in isolation from other described characteristics (even if this selection is isolated from a phrase containing those other characteristics), if this selection of characteristics is sufficient to provide a technical advantage or to differentiate the invention from the prior art. This selection will comprise at least one characteristic, preferably a functional one without structural details, or with only a portion of the structural details if that portion alone is sufficient to provide a technical advantage or to differentiate the invention from the prior art.

In the present description of modes of implementation and variants, the steam is by default water vapor.

By default, all pressures indicated in the present description are absolute pressures.

FIG. 1 is an example of a device for continuous hydrothermal carbonization of sludge according to the invention. This device comprises a reactor 4 designed to carry out a hydrothermal reaction stage.

This hydrothermal reaction stage involves the following steps:
- a step of introduction of sludge in which the sludge is introduced into the reactor 4 by a first inlet 11,
- a step of endogenous injection of steam in which steam is injected into the reactor 4 by a second inlet 15,
- a step of extraction in which at least a portion of the sludge contained in the reactor 4 is extracted continuously by a sludge outlet 16.

Thus, in the reactor 4:
the first inlet 11 is designed to introduce the sludge into the reactor 4,
the second inlet 15 is designed to inject steam directly into the reactor 4,
the sludge outlet 16 is designed to continuously extract at least a portion of the sludge contained in the reactor 4 from it.

The sludge injected into the reactor 4 by the first inlet 11 is channeled as described below.

In the first place, the sludge containing organic matter is introduced into the device by an inlet e, coming for example from a hopper (not shown) to be channeled into a conduit 1a, for example by gravity. The sludge arriving in the conduit 1a typically has a dryness by weight of dry matter between 10 and 30%, typically between 18 and 24%.

This sludge is channeled by the conduit 1a up to a means of preheating 2 in continuous manner by a device (not shown) such as a pump, a worm screw, a device using gravity, a mechanical conveyor, or any means enabling a channeling of the sludge to the means of preheating 2 upstream from the first inlet 11.

The means of preheating 2 is designed to receive the sludge before its introduction into the reactor 4 and to raise the temperature of the sludge which it receives to a temperature of preheating greater than 70° C. The means of preheating 2 thus allows the performance of a preheating step in which the temperature of the sludge is raised prior to its introduction into the reactor 4 up to this temperature of preheating.

In the mode of implementation of FIG. 1, the means of preheating 2 is designed to inject microwaves into the sludge which it receives. Thus, the preheating step involves a step of injection of microwaves in which microwaves are injected into the sludge prior to its introduction into the reactor 4. This microwave injection step makes it possible to raise the temperature of the sludge up to the preheating temperature.

The means of preheating 2 is thus a microwave heating apparatus, whose power is adapted to bring the sludge, introduced at ambient temperature, up to a temperature of around 70° C.

The means of preheating 2 preferably comprises a non-metallic tubular enclosure (not shown), for example one made of a polymer such as fiberglass reinforced polyester ("SVR") or polypropylene homopolymer ("PPH"). This tubular enclosure passes through an action zone (not shown) in which microwaves are generated to ensure a continuous heating of the sludge channeled into this tubular enclosure. The materials of the means of preheating 2 are adapted to the low pressure of the sludge channeled into the tubular enclosure, close to atmospheric pressure, typically being less than 2 bars, and its temperature, preferably less than 90° C.

The tubular enclosure of the means of preheating 2 is preferably closed or protected by a metal grill able to confine the microwaves.

The sludge is then channeled to a pump 3 by a conduit 1b connecting the means of preheating 2 and the pump 3, and then to the reactor 4 by a conduit 1c connecting the pump 3 and the first inlet 11 of the reactor 4.

The means of preheating 2 can operate continuously or also by lot (or "batch").

In the case of a continuous operation of the means of preheating 2, the sludge and the microwaves interact throughout their travel through the conduit 1b upstream from the pump 3.

Since the sludge entering the device contains 70 to 90% water, it constitutes an environment particularly favorable to microwave heating, the microwaves being able to enter deep into the sludge and thus excite the water molecules which it contains.

The preheating temperature is preferably between 60 and 150° C. depending on the needs of the process. From an optimal standpoint, this preheating temperature is 70° C., that preheating temperature being able to substantially decrease the viscosity of the sludge and being compatible with the materials typically used to make the pump 3.

Thus, the sludge having undergone the preheating step is liquefied.

The liquefied sludge is introduced into the reactor 4, which is a hydrothermal carbonization reactor, by the first inlet 11 under the driving force produced by the pump 3.

Preferably, the sludge is injected directly and continuously into the reactor 4 so that it is rapidly integrated into the mixture contained in the reactor 4, this mixture being constituted of the sludge contained in the reactor 4 and the steam injected into this reactor 4. In this mode of implementation, the second inlet 15 for introduction of the sludge is distinct from the first inlet 11 for injection of steam into the reactor 4.

Preferably, the method further involves a step of circulation in which the mixture is placed in circulation within the reactor 4.

In the present description, the term "circulation" of sludge, of a mixture, or of a liquid in the reactor 4 designates any kind of movement of this sludge, this mixture, or this liquid in the reactor 4.

In the present description, the phrase "circulation path" designates the path along which this movement of any kind is performed in the reactor.

In the present description, the phrase "placing in circulation" of the sludge, of the mixture, or of a liquid in the reactor means the creating or the maintaining, directly inside the reactor 4, of the circulation (i.e. the movement) of the sludge, of the mixture, or of the liquid in the reactor, preferably regardless of the amplitude and the direction of the speed of introduction of the sludge into the reactor 4 by the first inlet 11.

This placing in circulation is done by means for placing in circulation which typically involve a circulator (not shown), such as a blade type, designed to make the sludge circulate in the interior space of the reactor 4 along the circulation path.

By "means of placing in circulation" or "circulator" of the sludge, of the mixture or of a liquid in the reactor is meant in the present description means designed to create or maintain the circulation (i.e. the movement) of the sludge, of the mixture, or of the liquid directly inside the reactor 4, preferably regardless of the amplitude and the direction of the speed of introduction of the sludge into the reactor 4 by the first inlet 11.

According to variants which are not represented, this circulator can involve:
an agitator with one or more blades, and/or
a worm screw, and/or
a pump, and/or
a sludge recirculation loop, and/or
a bubbling.

Thanks to the liquefaction of the sludge upstream from the reactor 4, its interaction with the steam injected into the reactor 4 is greatly facilitated and this steam condenses rapidly in the mixture, making it possible to obtain the desired temperature, typically on the order of 160-250° C., preferably 180-200° C.

Typically, the pressure and the temperature of the steam injected into the reactor 4 by the second inlet 15 are respectively on the order of 0.6-4 MPa and 160-250° C., preferably 2-2.5 MPa and 215-225° C.

According to this mode of implementation of the invention, the reactor 4 comprises a reagent inlet 12 connected to a reagent injection conduit 5, making it possible to inject a reagent into the reactor 4, such as an acid like sulfuric acid. Such a reagent injection promotes the reactions of carbonization of the sludge in the reactor 4.

Preferably, the inside space of the reactor 4 receiving the sludge is configured to form a degassing volume (not shown) in an upper part of this inside space (that is, a part with higher altitude than other parts of this inside space). The mixture does not circulate in this degassing volume. This degassing volume is designed to recuperate the incondensable gaseous products. The reactor 4 is also provided with an outlet for the incondensables 13 connecting the degassing volume to an evacuation conduit 30. This outlet for the incondensables 13 is typically driven by a valve to control the pressure in the reactor 4.

The sludge outlet 16 is designed to extract continuously from the reactor 4 at least a portion of the sludge which it contains.

The device of FIG. 1 also makes it possible to implement at least one cooling stage in which the sludge, having undergone the hydrothermal reaction stage, is cooled down. The at least one cooldown stage is described below.

The device is designed to realize a water heating stage in which heat contained in the sludge extracted from the reactor 4 is transferred to the water by means of a heat exchanger 6, and in which the water so heated is used to produce the steam used during the stage of endogenous steam injection.

In order to accomplish this, the device of FIG. 1 contains a heat exchanger 6 connected to the sludge outlet 16 by the conduit 1$d$. This device also contains a boiler 22 connected to this heat exchanger 6 by a conduit 21. This heat exchanger 6 is designed to transfer heat contained in the sludge extracted from the reactor 4 to water circulating between this heat exchanger 6 and the boiler 22 by the conduit 21. The boiler 22, powered by another energy source (not shown), is designed to supply the steam injected directly into the reactor 4 via a conduit 23 connected to the second inlet 15.

The water circulating in this heat exchanger 6 is typically heated up to a temperature between 120 and 260° C., typically between 160 and 170° C. This water heated in the heat exchanger 6 is taken to the boiler 22 by the conduit 21 which will produce the steam injected directly into the reactor 4 by the second inlet 15.

The water arriving by a conduit 20 in this heat exchanger 6 has an adequate quality for the production of steam (softness, demineralization, etc.).

This heat exchanger 6 can be of any type adapted to such an exchange, such as the tube in a tube type, the exhaust pipe type, the tube and shell type, etc.

Such a water heating stage by recuperation of heat contained in the sludge extracted from the reactor 4 allows for a lower energy consumption of the device.

The device of FIG. 1 also comprises a cooldown apparatus 7 designed to cool the sludge extracted from the reactor 4 and coming from the heat exchanger 6 by the conduit 1$e$ connecting them. Thus, this cooldown apparatus 7 is mounted downstream from the heat exchanger 6.

The sludge partially cooled by the heat exchanger 6 is channeled via the conduit 1$e$ into this cooldown apparatus 7 which carries out a final cooldown stage. This cooldown apparatus 7 is implemented such that the temperature of the sludge then channeled to a final dehydration treatment module 10 by the conduits 1$f$, 1$g$ reaches a temperature defined prior to its arrival in this module 10. This defined temperature is typically between 40 and 90° C., typically between 60 and 70° C.

To accomplish this final cooldown stage, the cooldown apparatus 7 can be an exchanger in which the sludge circulates on the one hand, and on the other hand a fluid such as water, air, or any available cooling fluid. Such a cooling fluid arrives in this cooldown apparatus or exchanger 7 by a conduit 24 and leaves it by a conduit 25. The type of exchanger is, for example, an exchanger of the tube in a tube type, or the tube in a an exhaust circuit type.

At the outlet from this cooldown apparatus 7, the sludge arrives at a laminar flow device 9 by the conduit if allowing this sludge to attain a pressure close to atmospheric pressure before the final dehydration treatment in the module 10. The laminar flow device 9 and the final dehydration treatment module 10 are connected to each other by the conduit 1$g$.

This laminar flow device 9 can be a pump, a valve, a diaphragm or any accessory making it possible to lower the pressure of the sludge.

In the solutions of the prior art calling for an injector-mixer upstream from the reactor, a homogeneous substance is injected in the reactor whose dryness has been diminished (it contains more water due to the input of steam). In these solutions, there is no interaction, inside the reactor, between the sludge and the steam injected.

The invention is distinguished essentially from the solutions of the prior art by the simultaneous use:

1) of preheating of the sludge upstream from the reactor 4 by a means different from steam alone, which makes it possible to reduce its viscosity without reducing its dryness and to lessen the need for heating in the reactor 4,
2) of decoupling:
    a) of the introduction of the sludge into the reactor 4 by the first inlet 11, this sludge so introduced being preheated to reduce its viscosity, maintain its dryness, and reduce the need for adding energy within the reactor 4,
    b) of the injection of steam into the reactor 4 by the second inlet 15, distinct from the first inlet 11. Optionally, the steam can be injected not via a single inlet 15 but via several distinct inlets (not shown), so as to optimize the zones of interaction between the mixture contained in the reactor 4 and the injected steam, and to optimize the regulation of the temperature conditions within the reactor 4. Each of these distinct steam injection inlets can be outfitted with a valve allowing for a fine control of the steam injection conditions and thus the operation of the reactor 4. In particular, they can be distributed along a circulation path of the mixture within the reactor 4,
3) of preheating of water for the production of the steam injected into the reactor 4.

In such a mode of implementation of the invention, the mixing and the interactions between the preheated sludge and the steam injected into the reactor 4 occur solely within the reactor 4. This interaction between sludge and steam allows not only an increasing of the temperature of the sludge circulating in the reactor 4 by heat exchange, but also the creation of a swirling of the sludge by virtue of the turbulence occurring in the zones of confluence of the circulating mixture and the incoming steam.

Finally, such a decoupling enables an optimal control of the quality of the steam injected, especially in the case of a large volume reactor, for long treatments, on the order of 3 hours time spent within the reactor, which is typically necessary for the hydrothermal carbonization, as compared to the 30 minutes of average time of circulation required for thermal hydrolysis.

Consequently, the liquefaction of the sludge by the microwaves greatly facilitates the homogenization of the mixture in the reactor 4, which makes it possible to simplify the reactor 4 from the standpoint of its design (for example, it may consist of a simple pipeline circulating in piston flow, not shown).

The preheating of the steam by the heat exchanger 6 makes it possible to optimize the thermal consumption.

Moreover, the heat exchanger 7 can be used for outside energy production.

In addition, if the cost of electricity is low, the mode of implementation of FIG. 1 is of great economic interest.

FIGS. 2 and 3 show a second and a third mode of implementation of the invention.

Several of the components of the device of FIGS. 2 and 3, particularly the reactor 4 and its operation, are similar in these second and third modes of implementation and in the first mode of implementation described above.

Thus, FIGS. 2 and 3 are described essentially in terms of their differences from FIG. 1.

In this second and this third mode of realization, the means of preheating 2 is designed to inject steam into the sludge which it receives. More specifically, the preheating stage includes a stage of exogenous steam injection in which steam is injected into the sludge prior to its introduction into the reactor 4 in order to raise its temperature up to the preheating temperature.

Besides a preheating, these modes of realization make it possible to recuperate the thermal heat injected into the system. In fact, the devices of FIGS. 2 and 3 moreover comprise means of additional heating 91, 92, 93, 94 designed to transfer heat contained in the sludge extracted from the reactor 4 to the sludge downstream from the means of preheating 2 and upstream from the reactor 4, so as to raise the temperature of the sludge downstream from the means of preheating 2 and upstream from the reactor 4. These means of additional heating 91, 92, 93, 94 thus allow the implementing of a stage of additional heating in which the temperature of the sludge having undergone the stage of preheating is raised prior to its introduction into the reactor 4 by transferring to this sludge heat contained in the sludge extracted from the reactor 4.

Thus, the preheating of the sludge is done by a double system: on the one hand, by an exogenous steam injection via the means of preheating 2; on the other hand, by an additional heating via the means of additional heating 91, 92, 93, 94. In the two cases, the principle consists in recuperating the heat of the sludge extracted from the reactor 4 and utilizing this heat to preheat the sludge prior to its introduction into the reactor 4.

In these modes of realization (FIGS. 2 and 3), the device comprises a heat exchanger 7 designed to transform into steam the water circulating in this heat exchanger 7 by utilizing the heat contained in the sludge extracted from the reactor 4, this steam being the steam injected into the sludge upstream from the reactor 4 by the means of preheating 2. To accomplish this, this water circulates in a conduit 25 connecting this heat exchanger 7 to the means of preheating 2.

This heat exchanger 7 serves to produce saturated or slightly superheated steam intended to be injected into the sludge circulating upstream from the reactor 4 by the means of preheating 2. Typically, the steam so produced has a pressure between 0.1 and 1 MPa, preferably between 0.15 and 0.3 MPa.

The heat exchanger 7 is of the flue gas tube scrubber type or any other exchanger able to produce saturated steam.

The water circulating in the heat exchanger 7 arrives by a conduit 21b with a quality suitable for the desired steam production, especially in terms of softness, demineralization, etc.

The sludge arriving at the means of preheating 2 by the conduit 1a is mixed there with low-pressure steam, typically between 0.1 and 1 MPa, through a dynamic or static mixing device, given the low quantities of steam used (typically 5-25% steam in terms of mass of the sludge). This steam typically has a temperature between 100 and 120° C., and a pressure between 0.15 and 0.3 MPa.

The heat exchanger 7 is dimensioned to produce a quantity of steam adapted to:

a) cool the sludge extracted from the reactor 4 and lower the temperature of the sludge passing through this heat exchanger 7. Typically, the temperature of the sludge leaving the heat exchanger 7 is on the order of 100-120° C.;

b) preheat the sludge upstream from the reactor 4 so that it is sufficiently liquefied upon leaving the means of preheating 2. Typically, the temperature of the sludge leaving the means of preheating 2 is on the order of 50-140° C., preferably 70-90° C.

Downstream from the pump 3 connected to the means of preheating 2 by the conduit 1$b$, the sludge is channeled toward an exchanger 91 by a conduit 1$c$1 connecting the pump 3 and this exchanger 91. The liquefaction of the sludge during the preheating stage encourages a good heat exchange in the exchanger 91.

The pump 3 channels the liquefied sludge under pressure to the exchanger 91, at a pressure corresponding to the operating pressure within the reactor 4 plus the head losses of the exchanger 91 situated downstream from this pump 3. This pressure is typically $P_{reactor}+P_{losses}$ where
- $P_{losses}$ denotes the head losses of the exchanger 91 and the conduits 1$c$1 and 1$c$2 (the conduit 1$c$2 connecting the exchanger 91 to the first inlet 11 of the reactor 4), typically between 0.1 and 1 MPa,
- $P_{reactor}$ denotes the nominal operating pressure of the reactor 4, typically between 0.6 and 3 MPa.

The second mode of realization (FIG. 2) and the third mode of realization (FIG. 3) is distinguished by the nature of the additional heating stage: in the mode of FIG. 2, this additional heating is of indirect type; in the mode of FIG. 3, this additional heating is of direct type.

In the second mode of realization (FIG. 2), the sludge is heated by the exchanger 91 by heat transfer from this sludge with a heat transfer fluid circulating in a loop 94, under the effect of a pump 92, between this exchanger 91 mounted upstream from the reactor 4 and an exchanger 93 mounted downstream from the reactor 4. This heat transfer fluid is heated by heat exchange in the exchanger 93 where it recovers heat contained in the sludge extracted from the reactor 4. By circulating in the loop 94, the heat so recuperated in the sludge extracted from the reactor 4 is transferred to the sludge circulating in the exchanger 91 upstream from the reactor 4. This heat transfer fluid is heated in the loop 94 to a temperature corresponding typically to the temperature of the reactor 4 minus 20 to 80° C., typically 40° C., which also corresponds to the preheating temperature in the conduit 1$c$2 plus 20 to 80° C., typically 40° C. The exchanger 93 can be of any type but preferably it is a tube in a tube type. The sludge cooled by the exchanger 93 is then channeled to the heat exchanger 7 by a conduit 1$e$.

In the third mode of realization (FIG. 3), the sludge circulating in the exchanger 91, arriving from the pump 3 and destined for the reactor 4, is heated by direct heat transfer from the sludge extracted from the reactor 4 and channeled to this same exchanger 91 by the conduit 1$d$.

At the exit from the exchanger 7, the sludge, having a temperature which may drop down to 100° C., is channeled to a tertiary exchanger 6 by the conduit 1$f$. This tertiary exchanger 6 makes it possible to perform a heat exchange between this sludge and the water circulating in this tertiary exchanger 6. This water arrives in the tertiary exchanger 6 by a conduit 20 and leaves it by a conduit 21. The water circulating in the conduit 21, thus heated by heat exchange with the sludge in the tertiary exchanger 6, is then channeled, via a branch Y21:
- on the one hand, to the conduit 21$b$ connected to the exchanger 7,
- on the other hand, to a conduit 21$a$ connected to the boiler 22 operating by the same principle as in the first mode of realization of FIG. 1.

Typically, this tertiary exchanger 6 is of any possible type and in particular a tube in a tube type. The water arriving at this tertiary exchanger 6 by the conduit 27 is of appropriate quality (softened or demineralized) and at ambient temperature. The water leaving this tertiary exchanger 6 by the conduit 21 is at a temperature on the order of 60-100° C., preferably 90° C. Preferably, this water leaving the tertiary exchanger 6 is stored in a buffer tank (not shown), for example in the area of the branching Y21. This buffer tank is for example a vat adapted to the needs of the device in terms of endogenous or exogenous steam generation.

This tertiary exchanger 6 makes it possible to lower the temperature of the sludge to less than 90° C., which prevents its evaporation during the decompression in the laminar flow device 9.

A last exchanger 8 can be added between the tertiary exchanger 6 and the laminar flow device 9 in order to further cool the sludge to the desired temperature before decompression. This last exchanger 8 is thus connected to the tertiary exchanger 6 by a conduit 1$g$ and to the laminar flow device 9 by a conduit 1$h$. This last exchanger 8 can be of any known type. It can cool the sludge by a fluid such as water, air, or any other refrigerant fluid entering this last exchanger 8 by a conduit 26 and leaving by a conduit 27. The water in the conduit 27 can be recuperated or not for process needs. This last exchanger 8, on the one hand, makes it possible to produce sludge at optimal thermal conditions, and on the other hand to recuperate an amount of energy which can be utilized outside the process described.

The laminar flow device 9 makes it possible to direct the carbonized sludge to an adequate treatment.

One example of the balance sheet is as follows:

Say there is 1000 kg of sludge at 20% dryness and 15° C.

107 kg of steam at 0.13 MPa and 108° C. is injected into the means of preheating 2 in order to preheat the sludge to 85° C.

Next, the sludge is preheated to 110° C. in the exchanger 91 before the introduction into the reactor 4 and then injects 161 kg of steam at 25 MPa and 225° C. into the reactor 4 in order to heat it to 190° C.

Upon leaving the exchanger 93 (FIG. 2), the sludge having undergone the hydrothermal carbonization reaction has a temperature of 164° C., heating the heat transfer fluid circulating in the loop 94 to 145° C.

Upon leaving the exchanger 7, the sludge is at 105° C.

Upon leaving the tertiary exchanger 6, the sludge is at 89° C.

Upon leaving the last exchanger 8, the sludge is at 80° C.

FIG. 4 shows a fourth mode of realization of the invention in which the device comprises the same mechanical components as the device of the first mode of realization, with the exception of the means of preheating 2, which is connected to the reactor 4 by a recirculation loop b. Thus, FIG. 4 is described essentially in terms of its differences from FIG. 1.

The recirculation loop b is designed to remove a fraction of the sludge contained in the reactor 4 and to mix this fraction with the sludge received by the means of preheating 2. More specifically, this device makes it possible to realize a preheating stage which involves a recirculation stage in which a fraction of the sludge contained in the reactor 4 is removed and in which this fraction is mixed with the sludge prior to its introduction into the reactor 4, so as to raise its temperature up to the preheating temperature.

Typically, the fraction of sludge arriving in the recirculation loop b has a temperature between 50 and 140° C., preferably 70-90° C.

The proportion of this fraction of recirculated sludge in regard to the quantity of sludge arriving in the means of preheating 2 by the conduit 1a is determined and controlled in order to obtain sludge in the means of preheating 2 at a target temperature. This proportion can be on the order of 100%. Typically, the proportion $D_{treated\ sludge}/D_{untreated\ sludge}$ is equal to $(T_{target}-T_{untreated})/(T_{treated\ sludge}-T_{target})\pm 10\%$, where:

$D_{treated\ sludge}$ denotes the flow rate of the fraction of recirculated sludge which is injected in the flow of untreated cold sludge arriving in the means of preheating 2 by the conduit 1a whose flow rate is $D_{untreated\ sludge}$ $T_{target}$ corresponds to the intended preheating temperature, for example, 90° C., before introduction into the reactor 4

$T_{treated\ sludge}$ corresponds to the temperature of the treated sludge leaving the reactor 4, for example, 180° C.

$T_{untreated\ sludge}$ corresponds to the temperature of the untreated sludge in the conduit 1a, at ambient temperature, for example 15° C.

Of course, the invention is not limited to the examples just described and many arrangements can be added to these examples without leaving the scope of the invention. For example, the recirculation loop b of FIG. 4 could be incorporated in the mode of realization of FIG. 2 or 3. Moreover, the different characteristics, shapes, variants and modes of realization of the invention can be combined with each other in various combinations as long as they are not incompatible with or exclusive of one another.

The invention claimed is:

1. A method of continuous hydrothermal carbonization of sludge containing organic matter, said sludge having a dryness between 10 and 30%, said method involving a stage of hydrothermal reaction carried out in a reactor (4), the hydrothermal reaction stage involving the following steps:
a step of introduction of sludge in which the sludge is introduced into the reactor (4) by a first inlet (11),
a step of endogenous injection of steam in which steam is injected into the reactor (4) by a second inlet (15),
a step of extraction in which at least a portion of the sludge contained in the reactor (4) is extracted continuously by a sludge outlet (16),
further comprising a step of preheating in which the temperature of the sludge is raised prior to its introduction into the reactor (4) up to a temperature of preheating greater than 70° C.,
wherein the second inlet (15) is distinct from the first inlet (11),
and wherein the step of preheating includes a step of microwave injection in which microwaves are injected into the sludge prior to its introduction into the reactor (4).

2. The method as claimed in claim 1, wherein the step of preheating involves a step of exogenous steam injection in which steam is injected into the sludge prior to its introduction into the reactor (4), and wherein the method furthermore involves a step of additional heating in which the temperature is raised for the sludge having undergone the step of preheating prior to its introduction into the reactor (4) by transferring to this sludge the heat contained in the sludge extracted from the reactor (4).

3. The method as claimed in claim 1, wherein the step of preheating involves a step of recirculation in which a fraction of the sludge contained in the reactor (4) is removed and in which this fraction is mixed with the sludge prior to its introduction into the reactor (4).

4. The method as claimed in claim 1, further comprising a step of circulation in which a mixture consisting of the sludge contained in the reactor (4) and the steam injected into the reactor (4) is placed in circulation within the reactor (4).

5. The method as claimed in claim 1, further comprising a step of heating of water in which heat contained in the sludge extracted from the reactor (4) is transferred to water by means of a heat exchanger (6), and in which the water so heated is used to produce some or all of the steam used during the step of endogenous steam injection.

6. A device for continuous hydrothermal carbonization of sludge containing organic matter, said sludge having a dryness between 10 and 30%, this device comprising a reactor (4) having:
a first inlet (11) designed to introduce the sludge into the reactor (4),
a second inlet (15) designed to inject steam directly into the reactor (4),
a sludge outlet (16) designed to continuously extract at least a portion of the sludge contained in the reactor (4) from it,
further comprising a means of preheating (2) upstream from the first inlet (11), this means of preheating (2) being designed to receive the sludge prior to its introduction into the reactor (4) and to raise the temperature of the sludge which it receives up to a temperature of preheating greater than 70° C., the second inlet (15) being distinct from the first inlet (11),
and the means of preheating (2) being designed to inject microwaves into the sludge which it receives.

7. The device as claimed in claim 6, wherein the means of preheating (2) is designed to inject steam into the sludge which it receives, the device further comprising means of additional heating (91, 92, 93, 94), designed to transfer heat contained in the sludge extracted from the reactor (4) to the sludge downstream from the means of preheating (2) and upstream from the reactor (4), so as to raise the temperature of the sludge downstream from the means of preheating (2) and upstream from the reactor (4).

8. The device as claimed in claim 6, further comprising a recirculation loop (b) designed to remove a fraction of the sludge contained in the reactor (4) and to mix this fraction with the sludge received by the means of preheating (2).

9. The device as claimed in claim 6, further comprising a heat exchanger (6) and a boiler (22), this heat exchanger (6) being designed to transfer heat contained in the sludge extracted from the reactor (4) to water circulating between this heat exchanger (6) and the boiler (22), the boiler (22) being designed to furnish some or all of the steam injected into the reactor (4) by the second inlet (15).

10. The method as claimed in claim 2, wherein the step of preheating involves a step of recirculation in which a fraction of the sludge contained in the reactor (4) is removed and in which this fraction is mixed with the sludge prior to its introduction into the reactor (4).

11. The method as claimed in claim 2, further comprising a step of circulation in which a mixture consisting of the sludge contained in the reactor (4) and the steam injected into the reactor (4) is placed in circulation within the reactor (4).

12. The method as claimed in claim 3, further comprising a step of circulation in which a mixture consisting of the sludge contained in the reactor (4) and the steam injected into the reactor (4) is placed in circulation within the reactor (4).

13. The method as claimed in claim 2, further comprising a step of heating of water in which heat contained in the sludge extracted from the reactor (4) is transferred to water by means of a heat exchanger (6), and in which the water so heated is used to produce some or all of the steam used during the step of endogenous steam injection.

14. The method as claimed in claim 3, further comprising a step of heating of water in which heat contained in the sludge extracted from the reactor (4) is transferred to water by means of a heat exchanger (6), and in which the water so heated is used to produce some or all of the steam used during the step of endogenous steam injection.

15. The method as claimed in claim 4, further comprising a step of heating of water in which heat contained in the sludge extracted from the reactor (4) is transferred to water by means of a heat exchanger (6), and in which the water so heated is used to produce some or all of the steam used during the step of endogenous steam injection.

16. The device as claimed in claim 7, further comprising a recirculation loop (b) designed to remove a fraction of the sludge contained in the reactor (4) and to mix this fraction with the sludge received by the means of preheating (2).

17. The device as claimed in claim 7, further comprising a heat exchanger (6) and a boiler (22) , this heat exchanger (6) being designed to transfer heat contained in the sludge extracted from the reactor (4) to water circulating between this heat exchanger (6) and the boiler (22), the boiler (22) being designed to furnish some or all of the steam injected into the reactor (4) by the second inlet (15).

18. The device as claimed in claim 8, further comprising a heat exchanger (6) and a boiler (22) , this heat exchanger (6) being designed to transfer heat contained in the sludge extracted from the reactor (4) to water circulating between this heat exchanger (6) and the boiler (22), the boiler (22) being designed to furnish some or all of the steam injected into the reactor (4) by the second inlet (15).

19. The method as claimed in claim 10, further comprising a step of circulation in which a mixture consisting of the sludge contained in the reactor (4) and the steam injected into the reactor (4) is placed in circulation within the reactor (4).

20. The method as claimed in claim 10, further comprising a step of heating of water in which heat contained in the sludge extracted from the reactor (4) is transferred to water by means of a heat exchanger (6), and in which the water so heated is used to produce some or all of the steam used during the step of endogenous steam injection.

\* \* \* \* \*